(12) United States Patent
Jeon

(10) Patent No.: US 12,308,680 B1
(45) Date of Patent: May 20, 2025

(54) PORTABLE CHARGING DEVICES WITH MULTI-CHARGING FUNCTIONS

(71) Applicant: SPIGEN KOREA CO., LTD., Seoul (KR)

(72) Inventor: In Sang Jeon, Seoul (KR)

(73) Assignee: SPIGEN KOREA CO., LTD., Seoul (KR)

( * ) Notice: Subject to any disclaimer, the term of this patent is extended or adjusted under 35 U.S.C. 154(b) by 0 days.

(21) Appl. No.: 18/884,989

(22) Filed: Sep. 13, 2024

(30) Foreign Application Priority Data

Jul. 23, 2024 (KR) .................. 10-2024-0097106

(51) Int. Cl.
*H01M 10/46* (2006.01)
*H02J 7/00* (2006.01)
*H02J 50/00* (2016.01)
*H02J 50/40* (2016.01)

(52) U.S. Cl.
CPC .......... *H02J 7/0044* (2013.01); *H02J 50/005* (2020.01); *H02J 50/402* (2020.01)

(58) Field of Classification Search
CPC ...... H02J 7/0044; H02J 7/0042; H02J 50/005; H02J 50/402
USPC .................. 320/107, 108, 114, 115, 116, 138
See application file for complete search history.

(56) References Cited

U.S. PATENT DOCUMENTS

2020/0412142 A1* 12/2020 Chen .................. H02J 50/10

FOREIGN PATENT DOCUMENTS

| CN | 104578329 A | * | 4/2015 | .......... H02J 7/0044 |
|----|----|----|----|----|
| CN | 215267731 U | * | 12/2021 | |
| CN | 221531012 U | * | 8/2024 | |
| KR | 101285084 B1 | * | 7/2013 | |
| KR | 101788469 B1 | * | 10/2017 | |
| KR | 10-2121102 B1 | | 6/2020 | |
| KR | 10-2022-0131713 A | | 9/2022 | |
| WO | WO-2024158350 A1 | * | 8/2024 | |

* cited by examiner

*Primary Examiner* — Edward Tso
(74) *Attorney, Agent, or Firm* — Bridgeway IP Law Group, PLLC; Jihun Kim

(57) ABSTRACT

Embodiments relate to a charging device with improved multi-charging function and portability by enabling shape deformation for mounting multiple products or reducing volume through simple operation. According to an embodiment, a charging device connected to an external power supply includes a main body part with a first groove formed in an upper portion, a link part with one end thereof is hinge-coupled to the upper portion of the main body part, and a first wireless charging unit with a second groove formed in a lower portion and is hinge-coupled to the other end of the link part, wherein, when the main body part and the first wireless charging unit are in close contact with each other by lowering the first wireless charging unit toward the main body part, the link part is disposed in an internal space formed by connecting the first groove and the second groove.

17 Claims, 11 Drawing Sheets

PORTABLE CHARGING DEVICES WITH MULTI-CHARGING FUNCTIONS

CROSS-REFERENCE TO RELATED APPLICATIONS

This application claims priority to and the benefit of Korean Patent Application No. 10-2024-0097106, filed on Jul. 23, 2024, the disclosure of which is incorporated herein by reference in its entirety.

FIELD

The present disclosure relates to a charging device, and more particularly, to a charging device for charging a product with a built-in battery.

BACKGROUND

Unless otherwise indicated herein, the contents described in this section are not the related art to the claims of this application, and the contents included in this section should not be construed as the related art.

Recently, the number of users of watches and wireless earphone charging cases linked to smartphones is increasing, and the demand for a portable charging device which can simultaneously charge a smartphone, a smart watch, and a wireless earphone charging case is also increasing. On one hand, the existing charging devices improve portability with its foldable structure and provide a charging function that can simultaneously charge the smartphone, the smart watch, and the wireless earphone charging case, but it may be inconvenient to mount the smartphone, the smart watch, and the wireless earphone charging case in an accurate and stable charging position.

On the other hand, some of the existing charging devices have an attractive appearance and a structure which makes it easy to mount portable products to be charged, but significantly reduce portability because they are not foldable and/or may be difficult to disassemble. Therefore, it may be necessary to develop a charging device that provides the mounting stability of the portable products while improving their portability.

SUMMARY

The present disclosure provides a charging device with improved multi-charging function and portability by enabling shape deformation or reducing volume through simple operation. The present disclosure is not limited to the technical problem as described above, and other technical problems may be derived from the following description.

According to an embodiment of the present disclosure, a charging device connected to an external power supply includes a main body part with a first groove formed in an upper portion, a link part with one end thereof is hinge-coupled to the upper portion of the main body part, and a first wireless charging with a second groove formed in a lower portion and is hinge-coupled to the other end of the link part, wherein, when the main body part and the first wireless charging unit are in close contact with each other by lowering the first wireless charging unit toward the main body part, the link part is disposed in an internal space formed by connecting the first groove and the second groove.

The charging device further includes a second wireless charging unit hinge-coupled to the first wireless charging unit through a torque hinge, wherein the second wireless charging unit rotates when a predetermined force or a force greater than the predetermined force is applied to the first wireless charging unit on a different vertical line from the link part. The first wireless charging unit comprises a third groove formed in the lower portion thereof on a different vertical line from the second groove. The second wireless charging unit is coupled to a portion of the first wireless charging unit which rotates about the link part with a largest rotation radius, and second wireless charging unit is folded into or unfolded from the third groove.

The main body part includes an insertion groove formed in the lower portion thereof and a first terminal formed on a side surface thereof. When the first wireless charging unit is lowered, the main body part and the first wireless charging unit are in close contact with each other to form a cylindrical or prism shape. The charging device further includes a third wireless charging unit including a second terminal coupled to the main body part, wherein the third wireless charging unit is inserted into the insertion groove and is physically or electrically detachable from the first terminal. The one end of the link part is inserted into the first groove formed at a position adjacent to one side surface of the main body part, and the other end thereof may be inserted into the second groove formed at a position adjacent to one side surface of the first wireless charging part. The main body part includes a first main body that is formed in a hexahedral shape and has a non-slip member attached to a floor and an upper portion plate formed of a magnetic or metal material that is bent in a large arc shape and is coupled to the upper portion of the first main body on a different vertical line from the link part.

According to another embodiment of the present disclosure, a charging device connected to an external power supply includes a main body part with an insertion groove formed in a lower portion of the main body part and a first terminal formed on a side surface of the main body part, a link part with one end thereof is hinge-coupled to the upper portion of the main body part, and a first wireless charging unit hinge-coupled to the other end of the link part, wherein, when the first wireless charging unit and the link part are lowered and folded into the main body part, the main body part, the first wireless charging unit, and the link part are switched to a first state with a maximum width of 60 to 70 mm, a maximum depth of 60 to 70 mm, and a maximum height of 35 to 45 mm, and when the first wireless charging unit and the link part are lifted by a predetermined distance, the maximum height is increased to 110 to 120 mm.

The charging device further includes a second wireless charging unit hinge-coupled to the first wireless charging unit through a torque hinge, wherein the second wireless charging unit rotates when a predetermined force or a force greater than the predetermined force is applied to the first wireless charging unit on a different vertical line from the link part, and wherein the second wireless charging unit may move to a rear of the first wireless charging unit while the first wireless charging unit is lifted, the maximum depth is creased to 90 to 110 mm.

The charging device further includes a third wireless charging unit including a second terminal coupled to the main body part, wherein the third wireless charging unit is inserted into the insertion groove and is physically or electrically detachable from the first terminal, and wherein, when the third wireless charging unit is electrically connected to the first terminal on the side surface of the main body part, the maximum width is increased to 115 to 125 mm.

When the first wireless charging unit is lowered, the main body part and the first wireless charging unit are in close contact with each other to form a cylindrical or prism shape. The charging device further comprises a third wireless charging unit including a second terminal coupled to the main body part, wherein the third wireless charging unit is inserted into the insertion groove and is physically or electrically detachable from the first terminal. The main body part includes a first main body that is formed in a hexahedral shape and has a non-slip member attached to a floor thereof and an upper portion plate formed of a magnetic or metal material that is bent in a large arc shape and the upper portion plate coupled to the upper portion of the first main body on a different vertical line from the link part.

According to yet another embodiment of the present disclosure, a charging device connected to an external power supply comprises a main body part with a first groove formed in an upper portion of the main body part, an insertion groove formed in a lower portion of the main body part, and a first terminal formed on a side surface of the main body part; a link part with one end thereof is hinge-coupled to the upper portion of the main body part; and a first wireless charging unit with a second groove formed in a lower portion and is hinge-coupled to the other end of the link part, wherein, when the main body part and the first wireless charging unit are in close contact with each other by lowering the first wireless charging unit toward the main body part, the link part is disposed in an internal space formed by connecting the first groove and the second groove.

The charging device further comprises a second wireless charging unit hinge-coupled to the first wireless charging unit through a torque hinge, wherein the second wireless charging unit rotates when a predetermined force or a force greater than the predetermined force is applied to the first wireless charging unit on a different vertical line from the link part. The first wireless charging unit comprises a third groove formed in the lower portion thereof on a different vertical line from the second groove. The second wireless charging unit is coupled to a portion of the first wireless charging unit which rotates about the link part with a largest rotation radius, and the second wireless charging unit is folded into or unfolded from the third groove. The charging device further comprises a third wireless charging unit including a second terminal coupled to the main body part, wherein the third wireless charging unit is inserted into the insertion groove and is physically or electrically detachable from the first terminal.

BRIEF DESCRIPTION OF THE FIGURES

Example embodiments are illustrated by way of example and not limitation in the figures of the accompanying drawings, in which like references indicate similar elements and in which.

Figure 1:
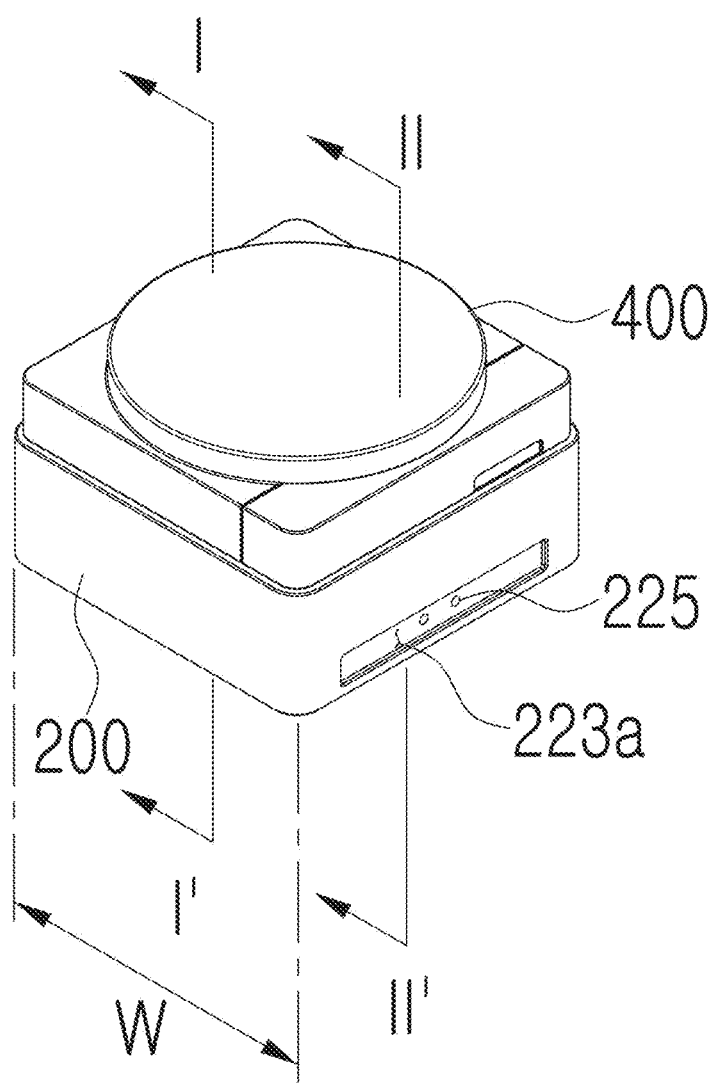
FIG. 1 is a perspective view illustrating a first state of a charging device, according to an embodiment of the present specification.

Other features of the present embodiments will be apparent from the accompanying drawings and from the detailed description that follows.

DETAILED DESCRIPTION

Hereinafter, configurations, operations, and effects of a charging device according to a preferred embodiment will be described with reference to the attached drawings. For reference, in the drawings below, each component is omitted or schematically illustrated for convenience and clarity, and the size of each component does not reflect the actual size. In addition, the same reference numerals throughout the specification refer to the same components, and drawing numerals for the same components are omitted in individual drawings.

Figure 2:
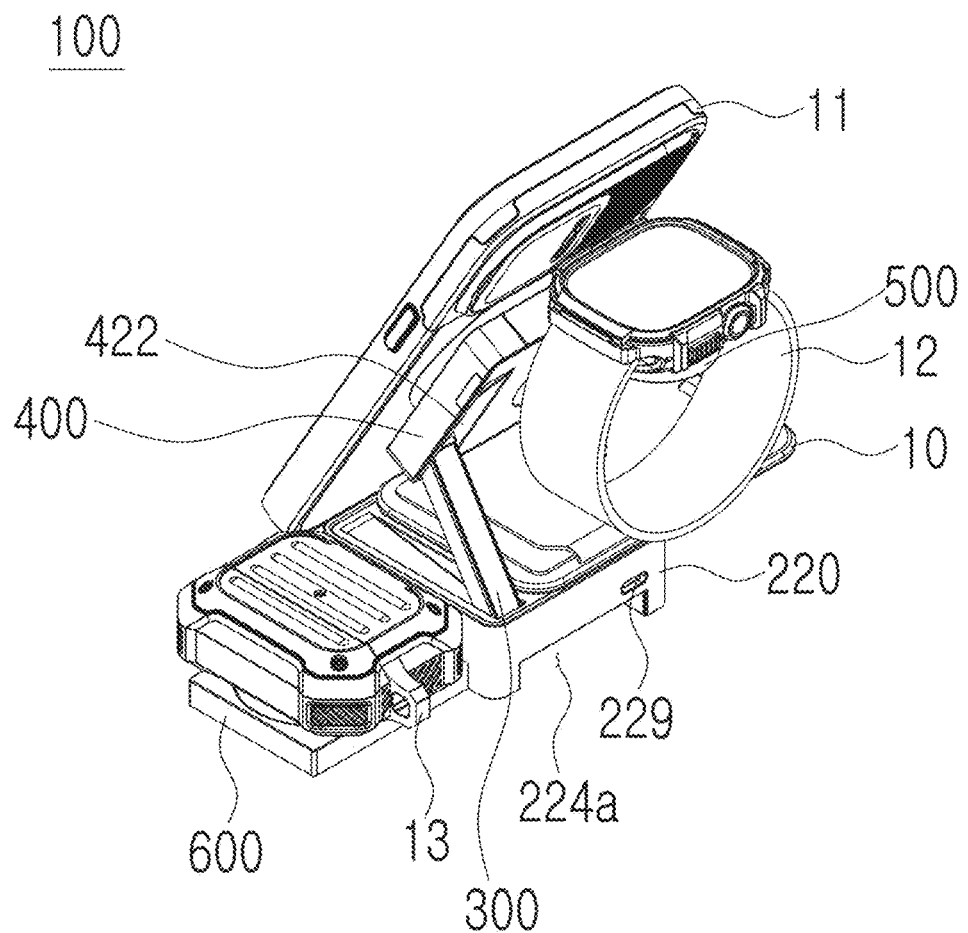
FIG. 2 is a usage state diagram illustrating a state in which the charging device of FIG. 1 is used for charging a product in a second state in which it is unfolded, according to an embodiment of the present specification.

In FIGS. 1 and 2, a charging device 100 is a device that is connected to an external power supply and wirelessly charges a battery built into a product mounted in a state where a shape of the device is deformed through a simple operation.

Before the shape is deformed, the charging device 100 maintains a folded state in a hexahedral shape, thereby improving portability, and when a portion thereof is unfolded upward, a product elongated due to gravity, such as a watch 12, is stably mounted.

Figure 3:
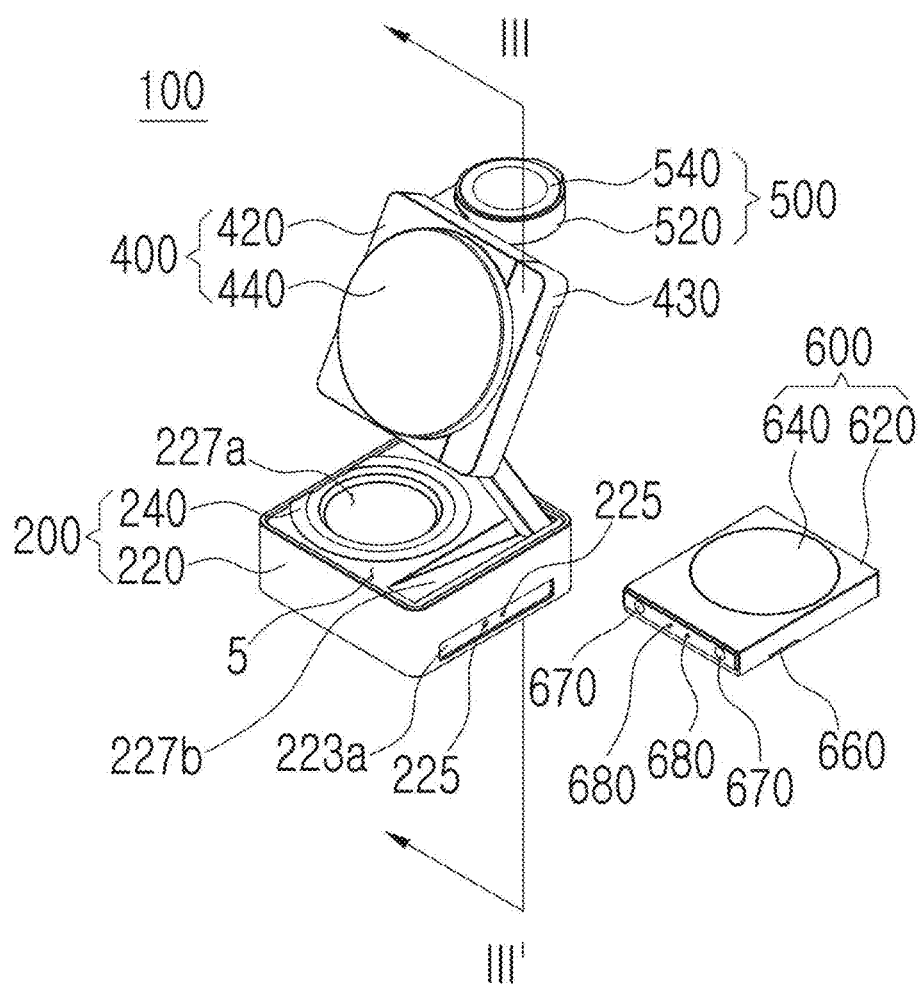
FIGS. 3 and 4 are perspective views illustrating other usage states of the charging device of FIG. 1, according to an embodiment of the present specification.

In FIGS. 1 through 3, the charging device 100 may supply power to a smartphone 11, the watch 12, and a charging case 13 in a state in which the shape is deformed and unfolded downward, and is magnetically coupled to an accessory with a metal component that is built into a mounting space 5 formed on an exposed portion in the unfolded state.

Figure 9:
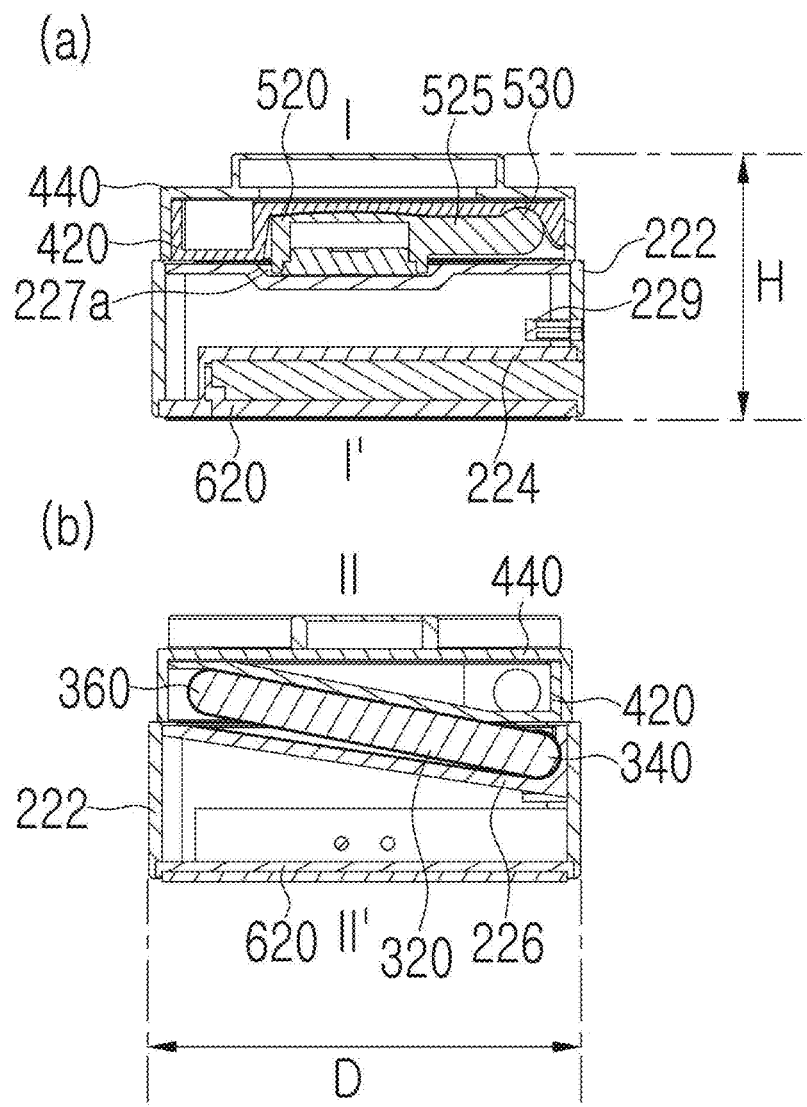
FIG. 9 is a cross-sectional view showing the charging device of FIG. 1 taken along lines I-I' and II-II', according to an embodiment of the present specification.

In FIGS. 1 and 9, a maximum width W in a first state where a first wireless charging unit 400 is lowered to the maximum and folded on an upper portion of a main body part 200 is 60 to 70 mm, and preferably, 65 mm. A maximum depth D in the first state where the first wireless charging unit 400 is lowered to the maximum and folded on the upper portion of the main body part 200 is 60 to 70 mm, and preferably, 65 mm. A maximum height H in the first state where the first wireless charging unit 400 is lowered to the maximum and folded on the upper portion of the main body part 200 is 35 to 45 mm, and preferably, 40 mm.

Here, the maximum width W means a length of a path connecting a vertical line corresponding to a portion protruding to the maximum to one side in the charging device 100 and a vertical line corresponding to a portion protruding to the maximum to the other side in the charging device 100 on a predetermined horizontal line, regardless of the deformation state of the charging device 100. In addition, the maximum depth D means a length of a path connecting a vertical line corresponding to a portion protruding to the maximum to a rear side in the charging device 100 and a vertical line corresponding to a portion protruding to the maximum to a front side in the charging device 100 on a predetermined horizontal line, regardless of the deformation state of the charging device 100.

In addition, the maximum height H means a length of a path connecting a horizontal line corresponding to a lowest end of the charging device 100 and a horizontal line of a portion protruding to the maximum to the upper portion in the charging device 100 on a predetermined vertical line, regardless of the deformation state of the charging device 100. The charging device 100 includes the main body part 200, a link part 300, the first wireless charging unit 400, a second wireless charging unit 500, and a third wireless charging unit 600.

In FIGS. 1 through 4, when the first wireless charging unit 400 moves upward in a state where the main body part 200 is disposed on a floor, and a portion of the link part 300 and the first wireless charging unit 400 move upward while being unfolded from the main body part 200. When the first wireless charging unit 400 itself is unfolded from the main body part 200, various types of accessories 10 with metal parts or magnets may be mounted in the mounting space 5 formed in the upper portion of the main body part 200, and in one example embodiment, an accessory 10 is an accessory 10 for MagSafe®. The main body part 200 has an upper plate 240 disposed on the upper portion thereof, and the accessory 10 mounted on the mounting space 5 is stably mounted on the upper portion of the main body part 200 while being magnetically coupled to the upper plate 240 coupled to the main body part 200. A non-slip member is coupled to a bottom surface of the lower portion of the main body part 200 surrounding an insertion groove 224a to prevent the main body part 200 from slipping.

Meanwhile, one of a Qi version wireless charging module including a baseline power profile (BPP) and an extended power profile (EPP), a Qi2 version wireless charging module, a made for apple watch (MFA) version wireless charging module, or a made for MagSafe® (MFM) certified MagSafe® wireless charging module may be built into the inside of the main body part 200, and when a product with a built-in battery is mounted on the upper portion of the main body part 200, the battery may be automatically charged. In case the wireless charging module is built into the inside of the main body part 200, the insertion groove 224a, which is formed in the lower portion of the main body part 200 to secure a space in which the wireless charging module (e.g., the third wireless charging unit 600) is disposed, may be utilized as a space where a power supply module connected to the external power supply is disposed.

In FIGS. 1 to 4, one end of the link part 300 and the other end of the link part 300 is torque hinge-coupled to the main body part 200 and the first wireless charging unit 400, respectively, so that the link part 300 is rotatable or fixed in position. Thus, when a predetermined force or a force greater than the predetermined force is applied to move the first wireless charging unit 400 upward, the link part 300 and the first wireless charging unit 400 moves by a predetermined distance in response to the force and then are fixed in a position. In FIGS. 1 and 9, the force required to lower the link part 300 and the first wireless charging unit 400 to deform the charging device 100 of FIG. 1 into the first state may exceed the weight of the product mounted on the first wireless charging unit 400 and the second wireless charging unit 500. Meanwhile, the force required to lower the link part 300 and the first wireless charging unit 400 may be adjusted by adjusting a torque hinge between the main body part 200 and the link part 300 and a torque hinge between the link part 300 and the first wireless charging unit 400.

In FIGS. 2 through 10, one end of the link part 300 is hinge-coupled with the upper portion of the main body part 200 so that the link part 300 is rotatable or fixed in position based on a first rotating shaft 340 which extends to both sides. An angle between a horizontal line on which the first rotating shaft 340 is disposed and the link part 300 may be adjusted according to the rotation. For example, when a predetermined force or a force greater than the predetermined force is applied to the link part 300 for a predetermined time to rotate the link part 300 by a predetermined angle based on the first rotating shaft 340, the link part 300 becomes fixed in position by the hinge. Specifically, one end of the link part 300 is hinge-coupled to the upper portion of the main body part 200 through the torque hinge structure. When the predetermined force or the force greater than the predetermined force is applied to the one end of the link part 300 to rotate the one end of the link part 300 by a predetermined angle, the position of the link part 300 becomes automatically fixed. In one example embodiment, the force required to rotate the one end of the link part 300 is greater than the sum of the weight of the link part 300, the weight of the first wireless charging unit 400, the weight of the second wireless charging unit 500, the weight of the product mounted on the first wireless charging unit 400, and the weight of the product mounted on the second wireless charging unit 500.

In FIGS. 3 to 10, the first wireless charging unit 400 is hinge-coupled to the other end of the link part 300 so as to be rotatable or fixed in position based on a second rotating shaft 360 which extends to both sides. The angle between the horizontal line on which the second rotating shaft is disposed and the first wireless charging unit 400 may be adjusted according to the rotation. For example, when the predetermined force or the force greater than the predetermined force is applied to the first wireless charging unit 400 to rotate the first wireless charging unit 400 by a predetermined angle based on the second rotating shaft 360, the other end of the link part 300 is fixed in position by the hinge. Specifically, the first wireless charging unit 400 is coupled to the link part 300 through the torque hinge structure. Thus, when the predetermined force is applied to the first wireless charging unit 400 to rotate the first wireless charging unit 400 by a predetermined angle based on the second rotating shaft 360, the position of the first wireless charging unit 400 becomes automatically fixed. In one example embodiment, the force required to rotate the first wireless charging unit 400 based on the second rotating shaft 360 is relatively greater than the sum of the weight of the first wireless charging unit 400, the weight of the product mounted on the first wireless charging unit 400, the weight of the second wireless charging unit 500, and the weight of the product mounted on the second wireless charging unit 500.

In FIG. 2, the first wireless charging unit 400 has a built-in magnet that can be coupled to a magnet built into the smartphone 11. Thus, even if the upper surface of the first wireless charging unit 400 is tilted with respect to a horizontal line positioned at the other end of the link part 300, the coupling between the smartphone 11 and the first wireless charging unit 400 is maintained.

The first wireless charging unit 400 has one of the Qi version wireless charging modules including the BPP and the EPP, the Qi2 version wireless charging module, the MFA version wireless charging module, or the MFM certified MagSafe® wireless charging module built therein. The first wireless charging unit 400 wirelessly supplies power to the product while being in close contact with the product including the smartphone 11 to charge the battery built into the product, and provides an angle adjustment function so that an angle between a display formed in the product and a user's line of sight is maintained at an optimal angle at which the user may feel comfortable. The first wireless charging unit 400 receives power from an external power supply connected to the main body part 200 through a cable built into the link part 300, and automatically charges the battery built into the smartphone 11 when the smartphone 11 is mounted on the first wireless charging unit 400.

In FIG. 2, the upper surface of the first wireless charging unit 400 faces forward and upward in the second state where the first wireless charging unit 400 moves to the upper portion of the main body part 200 by the rotation of the link part 300. The smartphone 11 is mounted on the upper portion of the first wireless charging unit 400 so that the display faces forward and upward. In the second state, when the first wireless charging unit 400 rotates so that the upper surface of the first wireless charging unit 400 faces rearward, the display of the smartphone 11 mounted on the first wireless charging unit 400 faces rearward simply by rotating only the first wireless charging unit 400.

Figure 10:
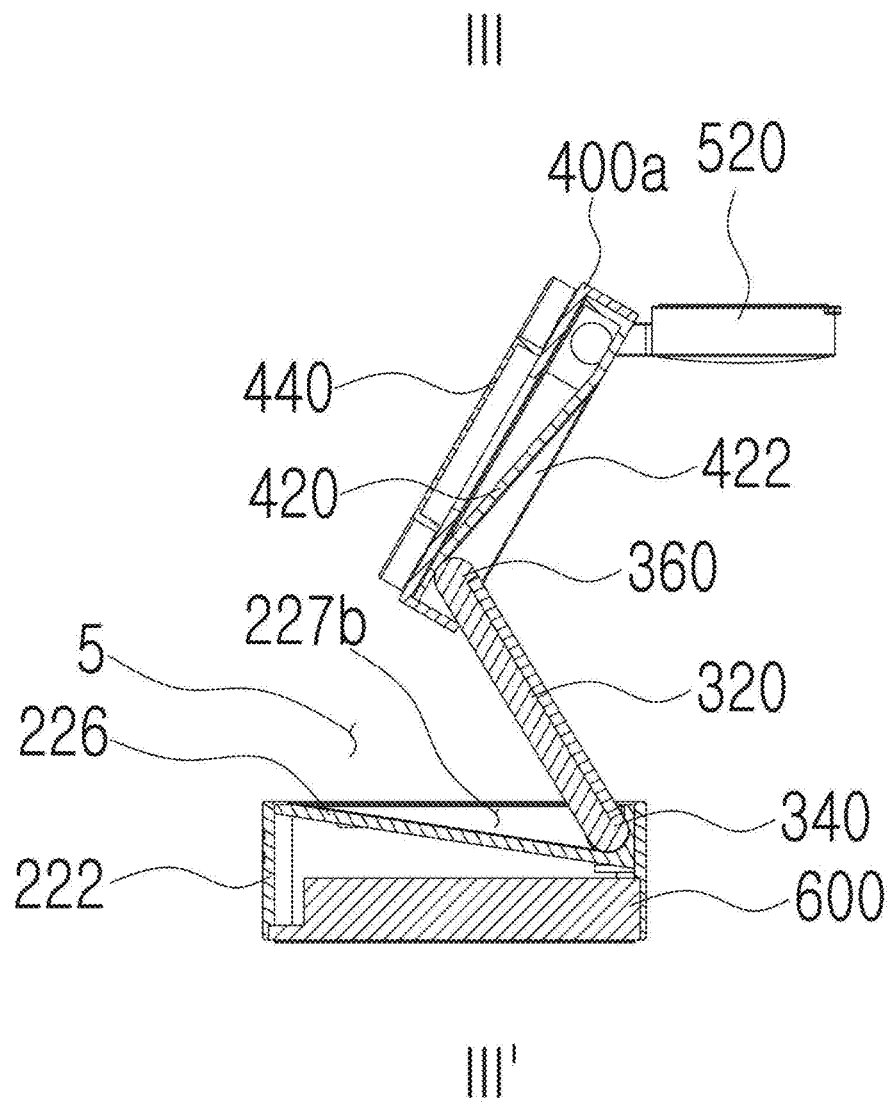
FIG. 10 is a cross-sectional view illustrating the charging device of FIG. 3 taken along line III-III'.

Specifically, In FIG. 10, while the first wireless charging unit 400 is viewed on one side, when the first wireless charging unit 400, with its upper surface disposed forward and upward, rotates clockwise by a predetermined angle around the second rotating shaft 360°, the display of the smartphone 11 mounted on the first wireless charging unit 400 faces rearward. Therefore, there is an advantage in that the direction in which the display of the smartphone 11 mounted on the first wireless charging unit 400 faces may be conveniently controlled by only rotating the first wireless charging unit 400 without having to rotate the entire charging device 100.

In one example embodiment, since the first wireless charging unit 400 is manufactured to be relatively larger than the second wireless charging unit 500, the first wireless charging unit 400 has one of the Qi2 version wireless charging module or the MFM certified MagSafe® wireless charging module built therein, and is suitable for charging the smartphone 11 equipped with a battery with a relatively higher capacity than that of the watch 12.

In FIG. 2, the smartphone 11 is mounted on the first wireless charging unit 400 in a state in which the lower portion of the smartphone 11, which has a relatively shorter edge length (e.g., a width) than an edge length of the other side (e.g., a length), is disposed toward the floor. In addition, the smartphone 11 may be mounted on the first wireless charging unit 400 in a state in which the lower portion of the smartphone 11, which has a relatively shorter edge length than the edge length of one side or the other side, is disposed toward the one side or the other side.

In FIGS. 2 to 9, the second wireless charging unit 500 is hinge-coupled to the rear of the first wireless charging unit 400 so as to be rotatable or fixed in position based on a third rotating shaft 530, which extends to both sides. The angle between the horizontal line on which the third rotating shaft 530 is disposed and the second wireless charging unit 500 may be adjusted according to the rotation. For example, when a predetermined force or a force greater than the predetermined force is applied to the second wireless charging unit 500 to rotate the second wireless charging unit 500 by a predetermined angle based on the third rotating shaft 530, a portion of the second wireless charging unit 500 is automatically fixed in position by the hinge.

In one example embodiment, the second wireless charging unit 500 is hinge-coupled to the first wireless charging unit 400 through the torque hinge. When the predetermined force or the force greater than the predetermined force is applied to the second wireless charging unit 500 to rotate the second wireless charging unit 500 by a predetermined angle based on the third rotating shaft 530, the position of the second wireless charging unit 500 is automatically fixed. In such case, the force required to rotate the second wireless charging unit 500 based on the third rotating shaft 530 is relatively greater than the sum of the weight of the second wireless charging unit 500 and the weight of the product mounted on the second wireless charging unit 500.

The second wireless charging unit 500 may be folded into the third groove 424 formed in the lower portion of the first wireless charging unit 400 by rotating it with respect to the third rotating shaft 530. The second wireless charging unit 500, when separated or unfolded from the third groove 424, provides a stand function of mounting the watch 12 and wirelessly charges the battery built into the mounted watch 12. The second wireless charging unit 500 has one of the Qi version wireless charging modules including the BPP and the EPP, the Qi2 version wireless charging module, the MFA version wireless charging module, or the MFM certified MagSafe® wireless charging module built therein, and wirelessly supplies power to the product while being in close contact with the product including the watch 12 to charge the battery built into the product.

In FIG. 10, when the other end of the link part 300 is lifted, the rear of the first wireless charging unit 400 is disposed on a relatively higher horizontal line than the other end of the link part 300. As the bottom surface of a second rotating main body 520 rotates to face upward, the second wireless charging unit 500 is disposed at a position relatively higher than the center of the upper surface of the first wireless charging unit 400. In such case, a space is generated in the lower portion of the second rotating main body 520, so the second wireless charging unit 500 is suitable for mounting a product like the watch 12 with its strap extending to the lower portion. In this case, the second rotating main body 520 is disposed so as to face the floor positioned at the rear of the first main body 220. Thus, when the watch 12 is mounted on the second wireless charging unit 500, the strap of the watch 12 is prevented from colliding with any one of the main body parts 200, the link part 300, or the first wireless charging unit 400. In addition, since the second wireless charging unit 500 is disposed at a relatively higher position than the first wireless charging unit 400, the MFA version wireless charging module suitable for the wireless charging of the watch 12 is built in.

In FIGS. 4 through 7, the third wireless charging unit 600 is manufactured in a hexahedral plate shape, inserted into an insertion groove 224a formed in the lower portion of the main body part 200, and detachably coupled to the main body part 200. The third wireless charging unit 600 has one of the Qi version wireless charging modules including the BPP and the EPP, the Qi2 version wireless charging module, the MFA version wireless charging module, or the MFM certified MagSafe® wireless charging module built therein. A plurality of non-slip members is coupled to the bottom surface of the third wireless charging unit 600 in a state in which they are spaced apart from each other on one side and the other side with a predetermined interval therebetween. Each of the plurality of non-slip members is manufactured in the form of a pad which extends long in the front and rear directions.

Meanwhile, in one example embodiment, the third wireless charging unit 600 is disposed on the horizontal line relatively lower than the first wireless charging unit 400 and the second wireless charging unit 500, so the third wireless charging unit 600 has the built-in Qi version wireless charging module including the BPP, and is suitable for charging the charging case 13 used for wireless earphones. The third wireless charging unit 600 is electrically connected to a first terminal 225 formed on the side surface of the main body part 200 through a second terminal 680 while being separated from the main body part 200, and wirelessly charges the battery built into a product, such as the charging case 13, mounted on the upper portion thereof using the power supplied from the main body part 200. The third wireless charging unit 600 is electrically connected to one side surface of the main body part 200 while being separated from the main body part 200, and has the advantage of improving space utilization as the entire upper surface of the third wireless charging unit 600 can be fully used as the stand for the product. For example, when the third wireless charging unit 600 is coupled to the main body part 200 so as to be able to slide into the main body part 200, a portion of the third wireless charging unit 600 is disposed inside the main body part 200 regardless of the position of the third wireless charging unit 600, thus reducing the space to mount the charging case 13.

However, since the third wireless charging unit 600 is electrically connected to the main body part 200 in a manner that it is in close contact with the side surface of the main body part 200 while being completely separated from the main body part 200, there is an advantage in that a sufficient space is secured for mounting the charging case 13. Meanwhile, the third wireless charging unit 600 may be torque hinge-coupled to any one of the lateral, rearward, or front positions of the main body part 200 other than the first wireless charging unit 400, and the third wireless charging unit 600 may be inserted into the inside of the main body part 200 or move to the outside of the main body part 200 according to the rotation.

As illustrated in FIG. 1, when the first wireless charging unit 400 and the other end of the link part 300 are lowered and the bottom surface of the first wireless charging unit 400 is in close contact with the upper portion of the main body part 200, the link part 300 is inserted or folded into an internal space formed by connecting a first groove 227b and a second groove 422 formed in the main body part 200 and the first wireless charging unit 400, respectively. Therefore, when the first wireless charging unit 400 is lowered and switched to the first state illustrated in FIG. 1, the link part 300 is inserted or folded into the internal space. As the lowering distance of the first wireless charging unit 400 is increased and the height of the charging device 100 is decreased, the portability of the charging device 100 is improved.

In FIGS. 2 through 8, the main body part 200 includes a first main body 220 and an upper plate 240, and the first main body 220 includes a first lower case 222, a charging module 224, a first terminal 225, and a first upper case 226. The main body part 200 is formed in a hexahedral shape in which the corners of the side surface are tapered to form a curved surface, and an inside thereof is provided with a power supply module that converts a commercial AC external power into a DC power and supplies the DC power.

Figure 4:
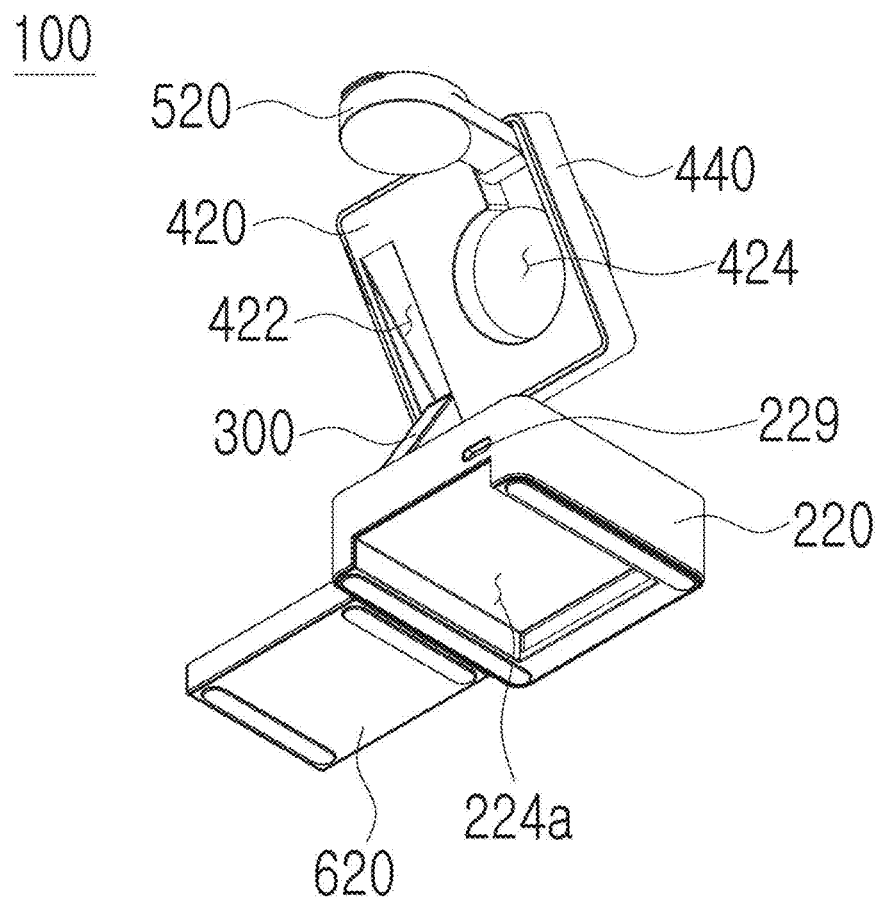

In FIG. 4, a silicone pad, which is a non-slip member that extends long in one direction, is in close contact with the bottom surface of the main body part 200, and the non-slip member prevents slipping between the main body part 200 and the floor. An outer side surface of the main body part 200 is made of one of the metals containing zinc to position the center of gravity of the charging device 100 at the center and to minimize the shape deformation while one end of the link part 300 rotates. The inner side of the main body part 200 is made of polycarbonate with excellent impact resistance, thermoplasticity, and hardness, thereby improving the durability, manufacturing convenience, and weight reduction of the main body part 200.

Specifically, referring to FIGS. 2 to 5, the first main body 220 is formed in a hexahedral shape in which the corners of the side surface are tapered to form a curved surface, an insertion groove 224a into which the third wireless charging unit 600 is inserted is formed in the lower portion, and a portion of the upper surface on one side is recessed to form a first groove 227b into which a portion of the link part 300 is inserted.

In FIG. 4, the insertion groove 224a is formed in a hexahedral shape where a portion of the bottom surface of the first main body 220 in a square shape is recessed upward by a predetermined distance and is opened rearward and downward of the first main body 220. In FIG. 3, a portion of the upper surface on the other side of the first main body 220 is recessed downward by a predetermined distance such that a circular first upper portion groove 227a into which a portion of the second wireless charging unit 500 is inserted is formed, and the first terminal 225 electrically connected to the third wireless charging unit 600 is formed on one side of the first main body 220.

Figure 6:
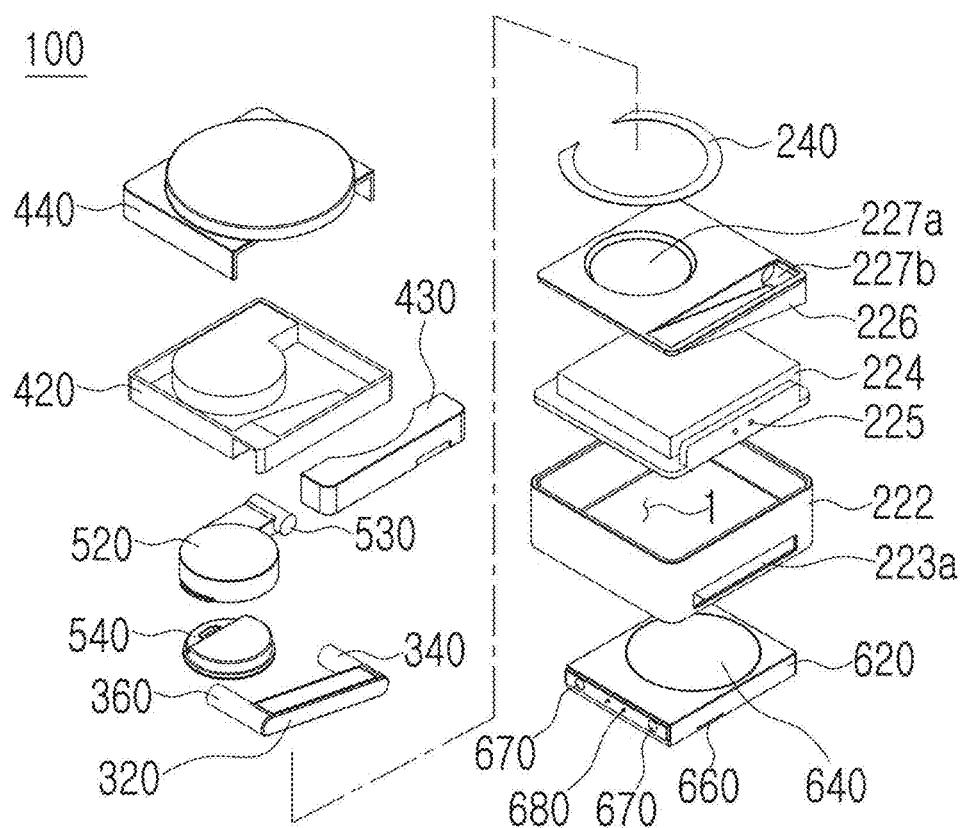
Figure 8:
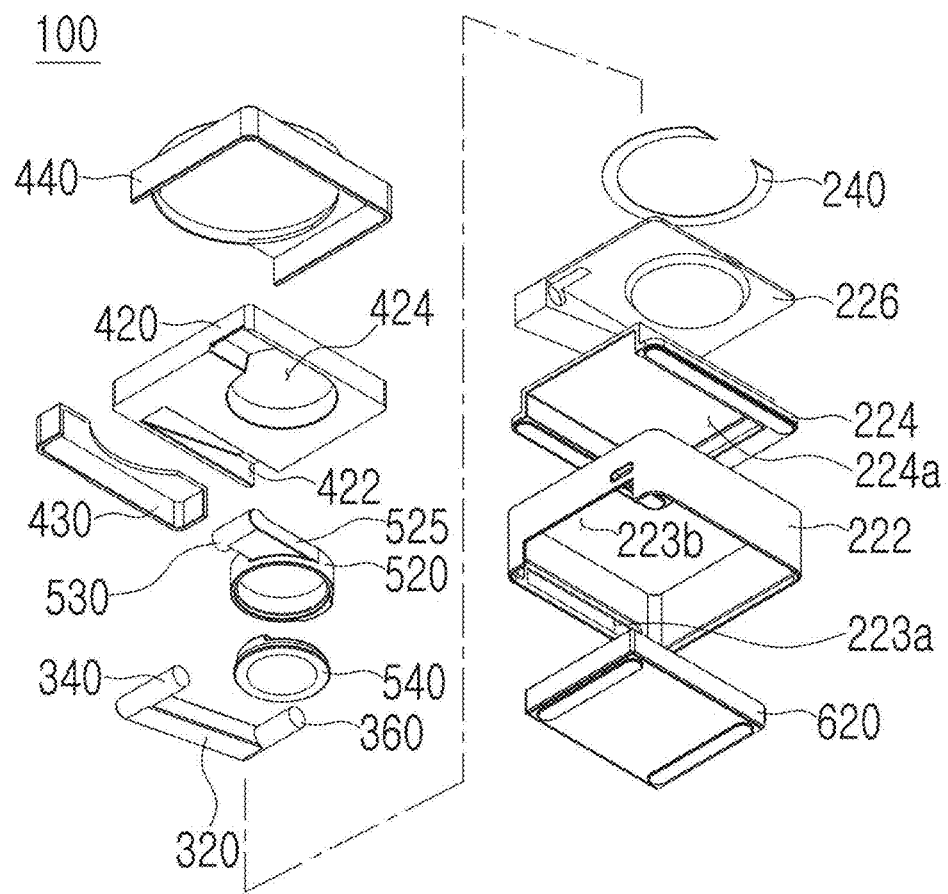

Specifically, referring to FIGS. 6 and 8, the first lower case 222 is manufactured in the form of a square tube in which a first space 1 in the form of a hexahedral shape is formed. The first lower case 222 is made of a metal containing zinc, and one side thereof is provided with a first side groove 223a to connect the first space 1 to an external space on one side. In FIG. 6, the first side groove 223a is adjacent to the edge of the lower portion of the first lower case 222, and a portion of the one side surface of the first lower case 222 in a rectangular shape extending long in the front-rear direction is recessed by a predetermined distance toward the other side to connect the first space 1 to the external space on one side. In FIG. 8, the second side groove 223b is formed such that a portion of the back surface of the first lower case 222 is recessed forward by a predetermined distance to connect the first space 1, the rear space of the first lower case 222, and the lower space and to connect the first space 1 and the rear space of the first lower case 222 to each other.

In FIGS. 6 and 8, the charging module 224 is manufactured in the form of a square cover made of a polycarbonate material covering both sides, the front, and the upper portion of the insertion groove 224a, and one side thereof is provided with the first terminal 225 that is electrically connected to the power supply module and is in contact with the power supply module to supply power to an external terminal. In a state in which a plurality of fixing magnets is disposed to be spaced apart from one side and the other side, respectively, with a predetermined interval on the inner surface of the charging module 224 at a position corresponding to the front of the insertion groove 224a, the plurality of fixing magnets may be magnetically coupled to each of the third magnets 670 to be described later.

Figure 7:
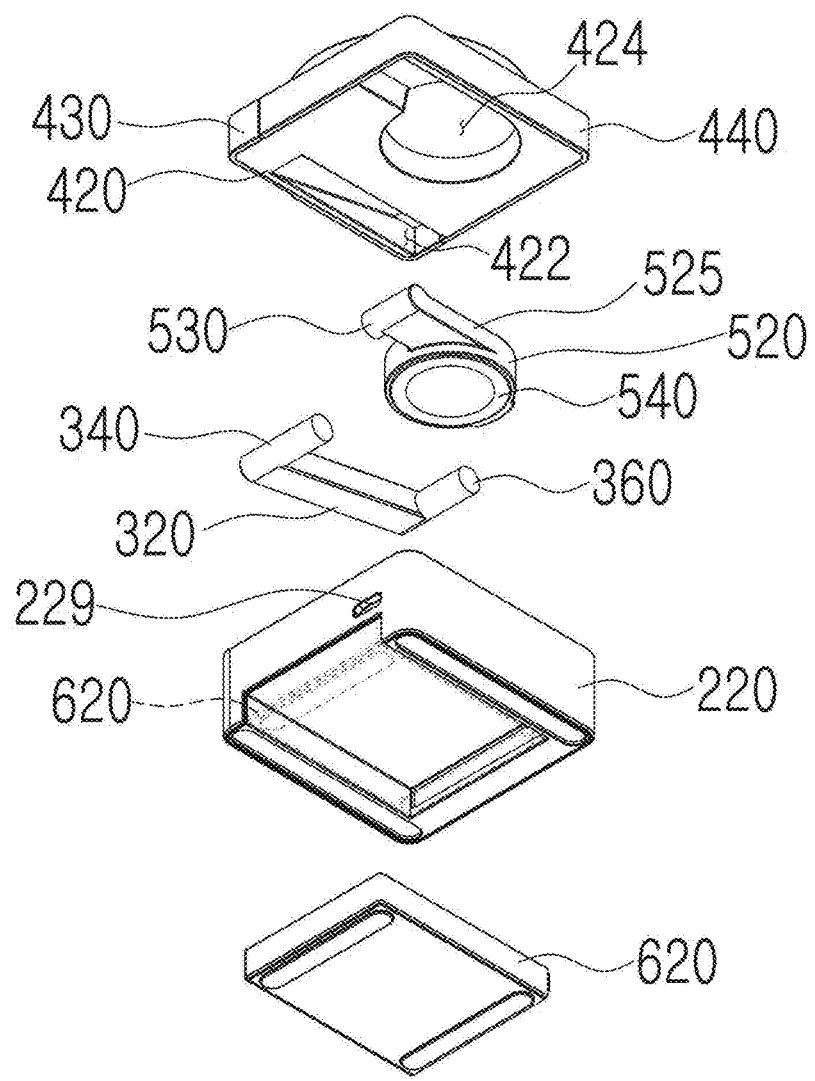

In FIGS. 7 and 8, in the state in which the first lower case 222 and the charging module 224 are coupled to each other, the insertion groove 224a is connected to the rear external space through the second side groove 223b in the lower portion of the charging module 224, and the insertion groove 224a is connected to the lower external space positioned in the lower portion of the first lower case 222. When the third wireless charging unit 600 is inserted into the insertion groove 224a, the third wireless charging unit 600 is fitted into the charging module 224. In addition, when a predetermined force is applied to the third wireless charging unit 600 so that the third wireless charging unit 600 moves rearward or downward, the third wireless charging unit 600 is separated from the main body 200.

Figure 5:
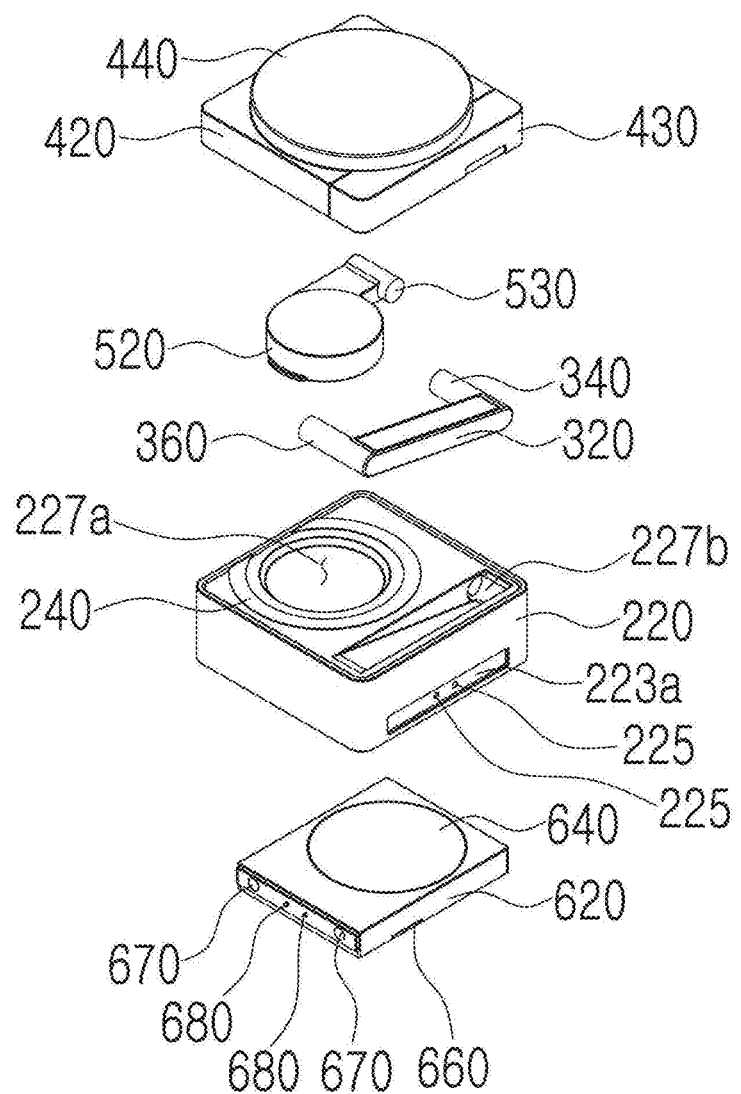
FIGS. 5 to 8 are exploded perspective views of the charging device of FIG. 1 viewed from different angles after disassembling the charging device, according to an embodiment of the present specification.

In FIGS. 5 and 6, the first terminal 225 is composed of a pair of pogo pins and is electrically connected to a power supply module, which is connected to one side of the charging module 224 and is disposed between the charging module 224 and the first upper case 226, through a cable. The first terminal 225 may be formed at any one of the front, other side, or rear positions of the charging module 224, and the positions of the first side groove 223a and the second side groove 223b formed in the first lower case 222 may also be changed accordingly.

In FIGS. 5 and 6, in the state in which the first lower case 222 and the charging module 224 are coupled to each other, the first terminal 225 is exposed to an external space on one side of the main body part 200 through the first side groove 223a, and the first terminal 225 is electrically connected to the second terminal 680 of the third wireless charging unit 600 separated from the main body part 200. The first upper case 226 is made of a polycarbonate material, and a first groove 227b in the shape of a triangular prism into which a portion of the link part 300 is inserted is formed on one side by recessing a portion of an upper surface downward by a predetermined distance. The first groove 227b is manufactured in the form in which the upper and lower thicknesses gradually increase as the first groove 227b extends from the front to the rear, and a first inclined surface extending obliquely toward the front and upper portions is formed on the lower portion of the first groove 227b. Further, side surfaces in the shape of right triangles are formed on both sides of the first groove 227b, respectively. Therefore, when the other end of the link part 300 is lowered and the main body part 200 and the first wireless charging unit 400 are in close contact with each other, a portion corresponding to half of the link part 300 is inserted into the first groove 227b.

In FIGS. 4, 7, and 8, a power terminal 229 is connected to the power supply module disposed on the upper portion of the charging module 224, exposed to the outside through the groove formed on the rear of the first lower case 222, and connected to the external power supply through the cable. The power terminal 229 may be any one of USB-A, USB-B, and USB-C ports, and the power terminal 229 may be manufactured in the USB-C port which is currently widely used as a standard terminal for mobile devices. The first upper portion groove 227a is formed by recessing a portion of the circular upper surface of the first upper case 226 positioned on the other side of the first groove 227b downward by a predetermined distance, and a space is provided into which a portion of the second wireless charging unit 500 may be inserted in the state in which the main body part 200 and the first wireless charging unit 400 are in close contact with each other.

In FIGS. 3 and 5, the upper plate 240 is manufactured to be bent in a large arc shape with the inner space open toward the other side, and is coupled to the upper portion of the first upper case 226 while surrounding the first upper portion groove 227a. The upper plate 240 may be made of a magnetic body or a metal material. In case the upper plate 240 is made of the magnetic body, it can be magnetically coupled to the accessory 10 with the built-in magnet or metal. In case the upper plate 240 is made of the metal material, it can be magnetically coupled to the accessory 10 having the built-in magnet.

In FIGS. 2 and 3, the upper plate 240 is magnetically coupled to the magnet attached to the accessory 10 to stably mount the accessory 10, which can be detached from and attached to the smartphone 11, on the mounting space 5 while the smartphone 11 is being charged through the first wireless charging unit 400. Since the upper plate 240 is manufactured to be bent in the large arc shape, its magnetic force on the magnet is relatively lower than that of a ring-shaped magnet or metal plate, so the accessory 10 may be accurately and stably mounted at the user's desired location while sliding from the other side of the mounting space 5 to one side. For example, since the magnetic force of the other side of the upper plate 240 is relatively smaller than the magnetic force of one side, in the initial entry stage of inserting the accessory 10 into the mounting space 5 from the other side of mounting space 5, the influence of the upper plate 240 is low, thus making it easy to insert the accessory 10 into the mounting space 5.

In addition, when the accessory 10 passes through the initial entry stage, the magnetic force of attraction between the magnets attached to the upper plate 240 and accessory 10 gradually increases in proportion to the distance moving from the mounting space 5 to one side, and the accessory 10 and the upper plate 240 are firmly coupled to each other in the state in which the accessory 10 is inserted to one side of the mounting space 5 adjacent to the link part 300. Therefore, the charging device 100 may stably mount the accessory 10, the smartphone 11, the watch 12, and the charging case 13 at the same time, thus preventing the loss of products related to the smartphone 11 and making the charging easy. In addition, there is an advantage in that the shape of the upper plate 240 makes it easy to insert the accessory 10 into the mounting space 5, and the firm coupling between the accessory 10 and the upper plate 240 is automatically performed by the magnetic coupling between the upper plate 240 and the accessory 10 in the state in which the accessory 10 moves to the other side of the mounting space 5.

In FIGS. 5 to 7, the link part 300 includes a link main body 320, a first rotating shaft 340, and a second rotating shaft 360. One end of the link part 300 is torque hinge-coupled to the main body part 200 in the first groove 227b so that it can be rotated or fixed in position, and the other end is torque hinge-coupled to the first wireless charging unit 400 in the second groove 422 so that it can be rotated or fixed in position. Specifically, one end of the link main body 320 is formed in a hexahedral shape that obliquely extends from the rear to the front and upper portion by a predetermined distance and is connected to the first rotating shaft 340, and the other end extends from the one end to the front and upper portion by a predetermined distance and is connected to the second rotating shaft 360.

In FIGS. 5 and 6, the first rotating shaft 340 is formed in a cylindrical shape which extends long on both sides and is coupled to the other side surface of one end of the link main body 320. Accordingly, a portion of the first rotating shaft 340 penetrates through the first upper case 226 at the inner rear of the first groove 227b and is coupled to be rotatable about the extension direction with the first upper case 226. In one example embodiment, the first rotating shaft 340 is hinge-coupled to be rotatable or fixed in position about the axis which extends from the first upper case 226 to both sides, and is preferably hinge-coupled to the first upper case 226 so that the angle may be adjusted through the torque hinge structure. The second rotating shaft 360 is formed in a cylindrical shape which extends in both directions and is connected to the other end of the other side surface of the link main body 320. Thus, a portion of the second rotating shaft 360 is hinge-coupled to the first rotating main body 420 so that it can rotate about the extension direction while penetrating through the first rotating main body 420 at a position corresponding to the inner front of the second groove 422. In one example embodiment, the second rotating shaft 360 is hinge-coupled to the first rotating main body 420 so that it can rotate or be fixed in position based on the shaft extending to both sides, and is hinge-coupled to the first rotating main body 420 so that the angle can be adjusted through the torque hinge structure.

In FIGS. 4, 6, and 9, the first rotating shaft 340 rotates so that the other end of the link main body 320 and the second rotating shaft 360 are lowered, and the link part 300 is disposed in an internal space formed by connecting the first groove 227b and the second groove 422 in the state in which the main body part 200 and the first wireless charging unit 400 are in close contact with each other. In the first state where the main body part 200 and the first wireless charging unit 400 are in close contact with each other and the portability of the charging device 100 with the improved mounting durability is improved, a portion of the link main body 320 positioned in the lower portion on the horizontal line corresponding to the bottom surface of the first wireless charging unit 400 is inserted or folded into the first groove 227b. When the main body part 200 and the first wireless charging unit 400 are in close contact with each other and the charging device 100 with improved mounting durability is switched to the first state, the charging device 100 is switched to a cylindrical or angular column shape, or a square column shape for the portability and aesthetics. In the first state where the main body part 200 and the first wireless charging unit 400 are in close contact with each other and the portability of the charging device 100 with the improved mounting durability is improved, a portion of the link main body 320 positioned in the lower portion on the horizontal line corresponding to the bottom surface of the first wireless charging unit 400 is inserted or folded into the first groove 227b.

In addition, since the link part 300 is disposed in the internal space formed by connecting the first groove 227b and the second groove 422 in the first state of the charging device 100, the height of the charging device 100 in the first state is relatively reduced compared to the height of the first state of another type of charging device without the first groove 227b and the second groove 422, thereby improving the portability. In addition, since the second wireless charging unit 500 is inserted or folded into the third groove 424 in the first state of the charging device 100, the main body part 200 and the first wireless charging unit 400 may be in close contact with each other, thereby reducing the volume of the charging device 100 and improving the portability. In addition, in FIG. 10, in the second state in which the first wireless charging unit 400 is separated or unfolded from the main body part 200 by the rotation of the link part 300 and is moved toward the upper portion of the main body part 200, the first wireless charging unit 400 is separated or unfolded from the main body part 200, thereby improving the mounting stability of the smartphone 11 mounted on the first wireless charging unit 400. For example, the first wireless charging unit 400 can be moved by the link part 300 to a position that is relatively higher than the position of the first wireless charging unit 400 in the charging device 100 in which the main body part 200 and the first wireless charging unit 400 are hinge-coupled to each other without the link part 300, so there is an advantage in that the mounting of the smartphone 11 and the watch 12 is convenient and the mounting stability is improved.

In FIGS. 5 through 8, the first wireless charging unit 400 includes a first rotating main body 420, a side cover 430, and a first wireless charger 440. The first wireless charging unit 400 is coupled to the main body part 200 to enable up-and-down movement through the link part 300, and is electrically connected to the main body part 200 to receive power supplied from the main body part 200. The first wireless charging unit 400 is hinge-coupled to be rotatable or fixed in position about the second rotating shaft 360 formed at the other end of the link part 300, and the hinge structure between the first wireless charging unit 400 and the second rotating shaft 360 is the torque hinge structure.

In FIG. 10, when the first wireless charging unit 400 rotates by a predetermined angle based on the second rotating shaft by the user's operation, the position is automatically fixed, and even in the state where the smartphone 11 is magnetically coupled to the first wireless charging unit 400, the position of the first wireless charging unit 400 may be maintained.

In FIG. 9, in the state in which the first wireless charging unit 400 and the main body part 200 are in close contact with each other, the angle between the horizontal line corresponding to the second rotating shaft 360 and the first wireless charging unit 400 is 0°, and the angle between the horizontal line corresponding to the second rotating shaft 360 disclosed in FIG. 10 and the first wireless charging unit 400 is 60° to 65°. In order to ensure the visibility of the display formed on the smartphone 11 mounted on the first wireless charging unit 400, the angle between the horizontal line corresponding to the second rotating shaft 360 and the first wireless charging unit 400 is preferably 60° to 65°.

The first wireless charging unit 400 wirelessly supplies power to a product including the smartphone 11 through the first wireless charger 440 where one of the Qi version wireless charging modules including the BPP and the EPP, the Qi2 version wireless charging module, the MFA version wireless charging module, or the MFM certified MagSafe® wireless charging module is built. Specifically, the first rotating main body 420 is manufactured in the form of a hexahedral square case, and is hinge-coupled to be rotatable or fixed in position about the second rotating shaft 360, which extend to the other end of the link part 300 in both directions. The first rotating main body 420 is torque hinge-coupled to be rotatable or fixed in position about the shaft extending from one end and both sides of the second wireless charging unit 500, and the second wireless charging unit 500 is disposed at the rear of the first rotating main body 420 or inserted into the third groove 424 according to the rotation. The first rotating main body 420 is made of zinc material to ensure that the center of gravity of the charging device 100 is stably maintained, and the first rotating main body 420 stably maintains the hinge state of the link part 300 and the second wireless charging unit 500 that are rotatably coupled to the first rotating main body 420.

In FIG. 8, the third groove 424 is formed as a circular portion of the bottom surface of the other side of the first rotating main body 420 and a portion of the bottom surface of the square shape adjacent to the rear of the circular portion are recessed upward to expose the third groove 424 toward the lower space of the first rotating main body 420, thus providing a space in which the second wireless charging unit 500 may be embedded. The second groove 422 is formed such that a portion of the bottom surface of the first rotating main body 420 positioned on one side of the third groove 424 is recessed upward, and provides a space in which a portion of the link part 300 is disposed when the charging device 100 is in the first state. The second groove 422 is manufactured in a form in which the thickness of the lower portion gradually increases in proportion to the distance extending from the rear to the front, a second inclined surface is formed on the upper portion of the second groove 422 that extends obliquely forward and upward, and an inner side surface in a right triangular shape is formed on both sides of the second groove 422.

The other end of the link part 300 is inserted into a position corresponding to the front of the second groove 422 and is hinge-coupled so as to be able to rotate or position-fix about the first rotating main body 420 and the second rotating shaft 360. When a pressure corresponding to a predetermined force or a force greater than the predetermined force is applied to the first rotating main body 420, the first rotating main body 420 rotates about the second rotating shaft 360, and when a pressure corresponding to the predetermined force or less is applied, the rotation of the first rotating main body 420 stops and is fixed in position.

In FIGS. 5 through 8, the side cover 430 is manufactured in the form of a corner cover that covers one side surface, a portion of the upper surface, a portion of the front surface, and a portion of the back surface of the first rotating main body 420, and is coupled to one side of the first rotating main body 420 to improve the durability of one side of the first wireless charging unit 400. The side cover 430 is made of a polycarbonate material and covers the outer side surface of the first rotating main body 420 made of zinc, thereby improving the impact resistance and strength of the first wireless charging unit 400. When the side cover 430 and the first wireless charger 440 are coupled to the first rotating main body 420, the upper surface, the front surface, the back surface, one side surface, and the other side surface of the first rotating main body 420 are blocked from the external space, and the bottom surface of the first rotating main body 420 is opened to the external space.

In FIGS. 5 through 8, the lower end portion of the first wireless charger 440 is formed in a case shape that covers the upper portion, the other side, the rear, and the front of the first rotating main body 420, and the upper end portion is manufactured in a circular plate shape in which one of the Qi version wireless charging module including the BPP and EPP, the Qi2 version wireless charging module, the MFA version wireless charging module, or the MFM certified MagSafe® wireless charging module is built.

Specifically, in FIG. 8, the lower end portion of the first wireless charger 440 is coupled to the upper portion of the first rotating main body 420, and is coupled to the first rotating main body 420 while being in close contact with the upper surface, the other side surface, the rear surface, and the front surface of the first rotating main body 420. The upper end portion of the first wireless charger 440 is formed in a cylindrical shape in which the diameter of the upper surface is relatively larger than the thickness of the upper and lower portions. The internal space of the first wireless charger 440 is opened upward, and one of the Qi version wireless charging modules including the BPP and EPP, the Qi2 version wireless charging module, the MFA version wireless charging module, or the MFM certified MagSafe® wireless charging module is disposed inside. The magnet is disposed inside the upper portion of the first wireless charger 440, and the first wireless charger 440 is magnetically coupled to the product including the smartphone 11 disposed in close contact with the upper portion through the magnetic force of the magnet. When the smartphone 11 is disposed on the upper end portion of the first wireless charger 440, the power supplied from the first main body 220 is automatically supplied to the smartphone 11 through the first wireless charger 440, and the smartphone 11 is automatically charged.

In FIGS. 3 through 9, the second wireless charging unit 500 includes a second rotating main body 520, a connecting member 525, a third rotating shaft 530, and a second wireless charger 540. The second wireless charging unit 500 is hinge-coupled to the bottom surface of the first wireless charging unit 400 so as to be rotatable or fixed in position about the third rotating shaft 530, and the hinge structure between the first wireless charging unit 400 and the third rotating shaft 530 is the torque hinge structure.

Specifically, in FIGS. 8 through 10, the second wireless charging unit 500 is hinge-coupled to the first wireless charging unit 400, particularly to a rear portion 400a having the largest rotation radius of the first wireless charging unit 400 that rotates about the other end of the link part 300 on a different vertical line from the link part 300. When the second wireless charging unit 500 rotates by a predetermined angle about the third rotating shaft 530 by a predetermined force or a force greater than the predetermined force, the position is automatically fixed, and even in the state in which the watch 12 is magnetically coupled to the second wireless charging unit 500, the position of the second wireless charging unit 500 is maintained.

In FIGS. 2 through 10, for the mounting stability of the accessory 10, the smartphone 11, the watch 12, and the charging case 13, the angle between the horizontal line corresponding to the second rotating shaft 360 and the first wireless charging unit 400 is 60°, and the second wireless charging unit 500 rotates so that its bottom surface faces upward to maintain the horizontal state with the bottom surface of the main body part 200.

In FIGS. 2 through 10, when a portion of the smartphone 11 mounted on the first wireless charging unit 400 collides with the watch 12 mounted on the second wireless charging unit 500, if the second wireless charging unit 500 rotates clockwise by a predetermined angle while looking at the charging device 100 from one side, the collision between the smartphone 11 and the watch 12 may be avoided. The second wireless charging unit 500 has one of the Qi version wireless charging modules including the BPP and the EPP, the Qi2 version wireless charging module, the MFA version wireless charging module, or the MFM certified MagSafe® wireless charging module built therein, and wirelessly supplies power to a product including the watch 12 mounted on the second wireless charging unit 500. A magnet is built in the second wireless charging unit 500, and when the watch 12 with the built-in magnet is in close contact with the bottom surface of the second wireless charging unit 500, the second wireless charging unit 500 and the watch 12 are magnetically coupled to each other, and the watch 12 is automatically wirelessly charged.

Specifically, in FIGS. 7 and 8, the second rotating main body 520, which is made of a polycarbonate material, is formed in a cylindrical shape in which an internal storage space is opened downward, and the second wireless charger 540 is stored in the internal storage space. The second rotating main body 520 is automatically fixed in position when it rotates by a predetermined angle based on the third rotating shaft 530 by the user's operation, and the position of the second rotating main body 520 is maintained even in the state where the watch 12 is magnetically coupled to the second wireless charger 540. One end of the connecting member 525 is formed in a plate shape extending forward and backward and is connected to the rear of the second rotating main body 520, and the other end is extended backward from one end by a predetermined distance and is connected to the third rotating shaft 530. The third rotating shaft 530 is manufactured in a cylindrical shape extending long on both sides, and is hinge-coupled to the first rotating main body 420 so that it can rotate or fix in position about the extension direction as a shaft in a hexahedral space corresponding to the rear of the third groove 424.

The second wireless charger 540 is formed in the shape of a circular plate with a built-in magnet, and is provided with one of the Qi version wireless charging modules including the BPP and the EPP, the Qi2 version wireless charging module, the MFA version wireless charging module, or the MFM certified MagSafe® wireless charging module. The second wireless charger 540 is coupled to the second rotating main body 520 while being inserted or folded into the storage space inside the second rotating main body 520, and one of the Qi version wireless charging module of including BPP and EPP, the Qi2 version wireless charging module, the MFA version wireless charging module, or the MFM certified MagSafe® wireless charging module built in the second wireless charger 540 is electrically connected to the power supply module built in the main body part 200.

In FIG. 9, when the second wireless charger 540 is inserted or folded into the storage space inside the second rotating main body 520, a portion of the second rotating main body 520 and a portion of the lower portion of the second wireless charger 540 protrude relatively downward from the bottom surface of the first rotating main body 420. While the first wireless charging unit 400 is lowered and the charging device 100 is switched to the first state, a portion of the second rotating main body 520 and a portion of the lower portion of the second wireless charger 540 are inserted or folded into the first upper portion groove 227a and are guided and stably fixed.

In FIG. 10, when the second rotating main body 520 and the second wireless charger 540 rotate counterclockwise by a predetermined angle while looking at the charging device 100 from one side, the bottom surface of the second wireless charger 540 is disposed to face upward.

In FIGS. 2 through 10, when the watch 12 is brought into close contact with the bottom surface of the second wireless charger 540 in the state where the bottom surface of the second wireless charger 540 is disposed upward, the magnet embedded in the watch 12 is magnetically coupled to the magnet embedded in the second wireless charger 540. When the watch 12 is in close contact with the bottom surface of the second wireless charger 540 in the state in which the bottom surface of the second wireless charger 540 is disposed upward, the power supplied from the main body part 200 automatically charges the battery built in the watch 12 through the second wireless charger 540.

In FIGS. 3 through 8, the third wireless charging unit 600 includes a second main body 620, a third wireless charger 640, a light source module 660, a third magnet 670, and a second terminal 680. The third wireless charging unit 600 is inserted or folded into the insertion groove 224a and is coupled to the main body part 200 so as to be detachable or attachable, and can be coupled to the main body part 200 so as to be electrically connected to the first terminal 225 while being separated from the main body part 200. The third wireless charging unit 600 is manufactured in a hexahedral shape in which the length between one side surface and the other side surface is relatively longer than the length between the bottom surface and the upper surface, and the second terminal 680 and the third magnet 670 electrically connected to the first terminal 225 are disposed on the front surface of the third wireless charging unit 600 while the third wireless charging unit 600 is inserted into the insertion groove 224a. In the state in which the third wireless charging unit 600 is electrically connected to the first terminal 225 through the second terminal 680, the power from the main body part 200 is supplied to the wireless charging module built in the third wireless charging unit 600 through the first terminal 225 and the second terminal 680.

The third wireless charging unit 600 has one of the Qi version wireless charging modules including the BPP and the EPP, the Qi2 version wireless charging module, the MFA version wireless charging module, or the MFM certified MagSafe® wireless charging module built therein. When the product including the charging case 13 is disposed in close contact with the upper portion of the third wireless charging unit 600, the third wireless charging unit 600 automatically wirelessly charges the battery built in the charging case 13. Since the third wireless charging unit 600 is disposed at a relatively low position than the first wireless charging unit 400 and the second wireless charging unit 500, an MFA version wireless charging module is built in the third wireless charging unit 600 in order to charge the charging case 13 used for the wireless earphone.

In FIG. 4, the maximum width W of the charging device 100 in the state where the third wireless charging unit 600 is electrically connected to one side of the main body part 200 is measured by the length from one side end of the third wireless charging unit 600 to the other side surface of the main body part 200 on the same horizontal line. As illustrated in FIG. 4, the maximum width W of the charging device 100 in the state where the third wireless charging unit 600 and the main body part 200 are electrically connected is 115 to 125 mm, and preferably, 121 mm. Specifically, the second main body 620 is manufactured in a hexahedral shape in which the area of the lower surface is relatively larger than the area of one of the side surfaces, the back surface, or the front surface, and a third wireless charger 640 is inserted and fixed into a circular groove formed in the upper portion.

The third wireless charger 640 is formed in the circular plate shape, receives power from the main body part 200 through the plurality of second terminals 680 coupled to the second main body 620, and automatically charges the battery built in the charging case 13 when the charging case 13 is mounted on the upper portion. The third wireless charger 640 has one of the Qi version wireless charging modules including the BPP and the EPP, the Qi2 version wireless charging module, the MFA version wireless charging module, or the MFM certified MagSafe® wireless charging module built therein. Since the third wireless charger 640 is positioned at a relatively lower position than the first wireless charger 440 or the second wireless charger 540, the third wireless charger 640 is equipped with the Qi version wireless charging module including BPP and EPP suitable for charging the battery built in the charging case 13 used for the wireless earphone. The light source module 660 is a light emitting diode module and displays the charging status of the product including the charging case 13 charged by the third wireless charger 640 using different colors.

Each of the plurality of third magnets 670 is coupled to the second main body 620 at a position spaced apart from one side and the other side of the front surface of the second main body 620, respectively, with a predetermined interval therebetween, and the front surface of each of the third magnets 670 is connected to the front surface of the second main body 620 without a step while being connected to the second main body 620 to form a plane. When the third wireless charging unit 600 is inserted into the insertion groove 224a, each of the plurality of third magnets 670 is magnetically coupled to each of the fixed magnets built in the charging module 224, and the third wireless charging unit 600 is detachably coupled to the main body part 200 by the fixed magnets. Each of the plurality of second terminals 680 is disposed at a position corresponding to an interval between the plurality of third magnets 670, and is coupled to the front surface of the second main body 620 while being disposed so that each of the plurality of second terminals 680 is spaced apart from one side and the other side with a predetermined interval therebetween.

In FIGS. 3 and 5, each of the plurality of second terminals 680 is manufactured as a pogo pin, and when a portion of the front of the second main body 620 is inserted into the first side groove 223a and fitted into the first main body 220, it is electrically connected to each of the plurality of first terminals 225. Meanwhile, the battery may be built inside the main body part 200, and in this case, the charging device 100 may supply power from the battery to one of the first wireless charging unit 400, the second wireless charging unit 500, or the third wireless charging unit 600 while being disconnected from the external power supply. In addition, the external power supply may be connected to any one of the main body parts 200, the link part 300, the first wireless charging unit 400, the second wireless charging unit 500, and the third wireless charging unit 600 to supply power to the charging device 100. Meanwhile, an external terminal that may be connected by a wire to an auxiliary battery or a product with a built-in battery may be formed outside of the main body part 200, the link part 300, the first wireless charging unit 400, the second wireless charging unit 500, and the third wireless charging unit 600, and the auxiliary battery or the product connected by a wire to the external terminal may be charged by a charging device 100 connected to the external power supply.

Figure 11:
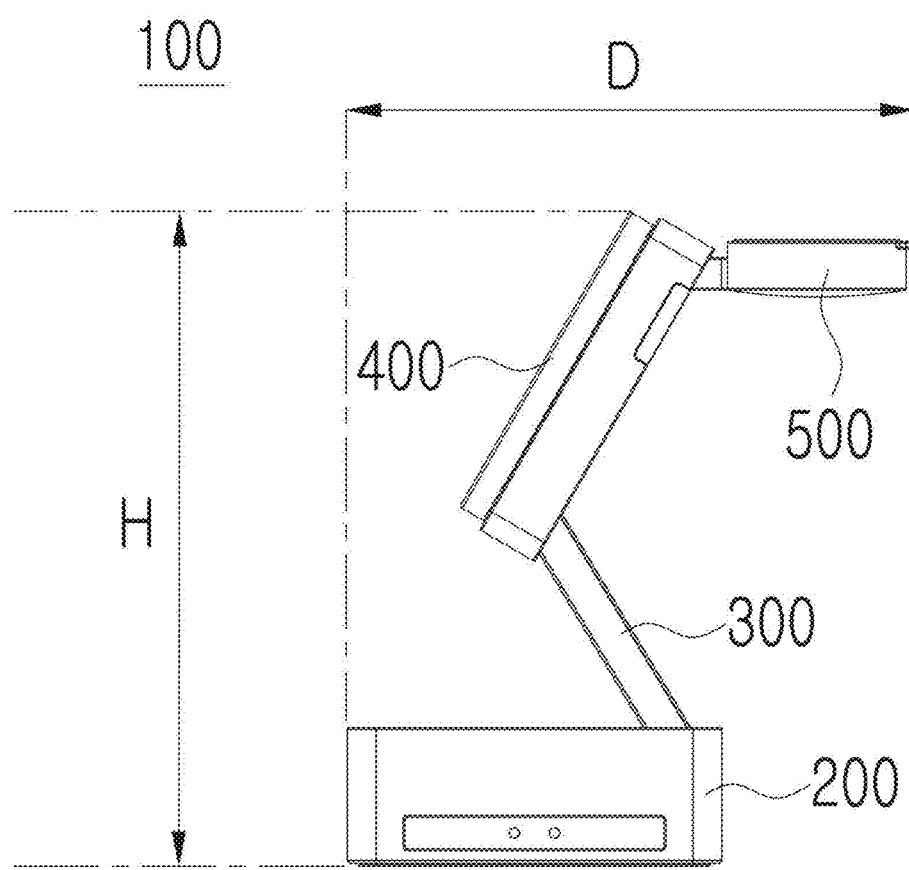
FIG. 11 is a side view illustrating one side surface of the charging device of FIG. 1, according to an embodiment of the present specification.

In FIG. 11, in the second state in which the first wireless charging unit 400 moves upward and rotates about the second rotating shaft 360, the maximum height H of the charging device 100 means a length of a path that connects the horizontal line corresponding to the bottom surface of the main body part 200 and the horizontal line corresponding to the end of the rear upper portion of the first wireless charging unit 400 to each other on the predetermined vertical line. In addition, in FIG. 11, in the second state where the first wireless charging unit 400 moves upward and rotates about the second rotating shaft 360, and the second wireless charging unit 500 rotates by a predetermined angle so that the bottom surface of the second wireless charging unit 500 faces upward, the maximum depth D of the charging device 100 means a length of a path that connects the vertical line corresponding to the front of the main body part 200 and the vertical line corresponding to the rear end of the second wireless charging unit 500 to each other on the predetermined horizontal line.

As illustrated in FIGS. 2 and 4, in the state in which the charging device 100 is switched to the second state, the maximum width W of the charging device 100 means a length of a path that connects the vertical line corresponding to one end of the third wireless charging unit 600 and the vertical line corresponding to the other side surface of the main body part 200 to each other on the predetermined horizontal line. In the state in which the charging device 100 is switched to the second state and the third wireless charging unit 600 is electrically connected to one side of the main body part 200, the maximum width W of the charging device 100 is 115 to 125 mm, and preferably, 121 mm.

As illustrated in FIG. 11, in the state in which the charging device 100 is switched to the second state, the maximum height H of the charging device 100 is 110 to 120 mm, and preferably, 114 mm. As illustrated in FIG. 11, in the state in which the charging device 100 is switched to the second state, the maximum depth D of the charging device 100 is 90 to 110 mm, and preferably, 98 mm. Therefore, the charging device 100 has the advantage of high portability because it has a maximum width W of 65 mm, a maximum depth D of 65 mm, and a maximum height H of 40 mm in the first state, and has the advantage of easily mounting the smartphone 11 and the watch 12, and additionally, mounting the accessory 10 in the mounting space 5 because it has a maximum width W of 121 mm, a maximum depth D of 98 mm, and a maximum height H of 114 mm in the second state.

According to an embodiment disclosed in this specification, the charging device has an advantage in that the lifting and lowering distance of the first and second wireless charging units separated from the main body part through the link part increases, thereby improving the mounting stability of the smartphone or watch.

In addition, the charging device has an advantage in that the link part is disposed in the internal space formed by connecting the first and second grooves while the first wireless charging unit and the main body part are in close contact with each other due to the lowering of the first and second wireless charging units, thereby improving the portability.

In addition, the second wireless charging unit is unfolded while the first wireless charging unit moves to the upper portion of the main body and supports the watch at a relatively higher position than the first wireless charging unit, thereby improving the mounting stability of the watch.

In addition, the third wireless charging unit can be disposed in the insertion groove formed at the lower portion of the main body, thereby facilitating the storage and portability, and the third wireless charging unit is electrically connected to the main body while being separated from the main body and the upper surface thereof is in complete contact with the charging case, thereby facilitating the mounting of the charging case.

In addition, when the first and second wireless charging units are separated from the main body part and move upward, the mounting space is formed between the main body part and the first wireless charging unit, thereby enabling the mounting of the accessories that are detachably connected to the smartphone.

In addition, since the link part is torque hinge-coupled so that it can rotate or fix its position with respect to the main body part and the first wireless charging unit, respectively, while being biased to one side, thereby increasing the mounting space where the accessories may be mounted while the main body and the first wireless charging unit are separated from each other.

In addition, since the effects of the present disclosure described as described above are naturally exerted by the composition of the described contents regardless of whether the inventor recognizes the effects, the above-described effects are only a few effects according to the described contents, and should not be recognized as describing all effects recognized or actually existing by the inventor. In addition, the effects of the present disclosure should be additionally recognized by the entire description of this specification, and even if they are not described in explicit sentences, if a person with ordinary knowledge in the technical field to which the described contents belong can recognize such effects through this specification, they should be considered as effects described in this specification.

Although the preferred embodiment of the present disclosure has been described with reference to the attached drawings, configurations described in exemplary embodiments and the accompanying drawings of the present disclosure do not represent all of the technical spirits of the present disclosure, but are merely most preferable embodiments. Therefore, the present disclosure should be construed as including all the changes, equivalents, and substitutions included in the spirit and scope of the present disclosure at the time of filing this application. Therefore, it is to be understood that the exemplary embodiment described above is not restrictive, but is illustrative in all aspects, the scope of the present disclosure is defined by the claims to be provided below rather than the detailed description, and it is to be understood that all the modifications or alterations deriving from the meaning and the scope of the claims and equivalents thereto fall within the scope of the present disclosure.

What is claimed is:

1. A charging device connected to an external power supply, comprising:
    a main body part with a first groove formed in an upper portion of the main body part;
    a link part with one end thereof being hinge-coupled to the upper portion of the main body part;
    a first wireless charging unit with a second groove formed in a lower portion of the first wireless charging unit and being hinge-coupled to another end of the link part; and
    a second wireless charging unit hinge-coupled to the first wireless charging unit through a torque hinge, wherein the second wireless charging unit rotates when a predetermined force or a force greater than the predetermined force is applied to the first wireless charging unit on a different vertical line from the link part,
    wherein, when the main body part and the first wireless charging unit are in close contact with each other by lowering the first wireless charging unit toward the main body part, the link part is disposed in an internal space formed by connecting the first groove and the second groove.

2. The charging device of claim 1, wherein the first wireless charging unit comprises a third groove formed in the lower portion thereof on a different vertical line from the second groove.

3. The charging device of claim 2, wherein the second wireless charging unit is coupled to a portion of the first wireless charging unit which rotates about the link part with a largest rotation radius, and the second wireless charging unit is folded into or unfolded from the third groove.

4. The charging device of claim 2, wherein the main body part includes an insertion groove formed in the lower portion thereof and a first terminal formed on a side surface thereof.

5. The charging device of claim 4, wherein when the first wireless charging unit is lowered, the main body part and the first wireless charging unit are in close contact with each other to form a cylindrical or prism shape.

6. The charging device of claim 4, further comprising:
    a third wireless charging unit including a second terminal coupled to the main body part, wherein the third wireless charging unit is inserted into the insertion groove and is physically or electrically detachable from the first terminal.

7. The charging device of claim 1, wherein the one end of the link part is inserted into the first groove formed at a position adjacent to one side surface of the main body part, and the other end thereof is inserted into the second groove formed at a position adjacent to one side surface of the first wireless charging unit.

8. The charging device of claim 7, wherein the main body part includes:
    a first main body that is formed in a hexahedral shape and has a non-slip member attached to a floor thereof; and
    an upper portion plate formed of a magnetic or metal material that is bent in a large arc shape and the upper portion plate coupled to the upper portion of the first main body on a different vertical line from the link part.

9. A charging device connected to an external power supply, comprising:
    a main body part with an insertion groove formed in a lower portion of the main body part and a first terminal formed on a side surface of the main body part;
    a link part with one end thereof being hinge-coupled to an upper portion of the main body part;
    a first wireless charging unit hinge-coupled to another end of the link part; and
    a third wireless charging unit including a second terminal coupled to the main body part, wherein the third wireless charging unit is inserted into the insertion groove and is physically or electrically detachable from the first terminal,
    wherein, when the first wireless charging unit and the link part are lowered and folded into the main body part, the main body part, the first wireless charging unit, and the link part are switched to a first state with a maximum width of 60 to 70 mm, a maximum depth of 60 to 70 mm, and a maximum height of 35 to 45 mm, and
    when the first wireless charging unit and the link part are lifted by a predetermined distance, the maximum height is increased to 110 to 120 mm.

10. The charging device of claim 9, further comprising:
    a second wireless charging unit hinge-coupled to the first wireless charging unit through a torque hinge, wherein the second wireless charging unit rotates when a predetermined force or a force greater than the predetermined force is applied to the first wireless charging unit on a different vertical line from the link part,
    wherein when the second wireless charging unit moves to a rear of the first wireless charging unit while the first wireless charging unit is lifted, the maximum depth is increased to 90 to 110 mm.

11. The charging device of claim 10,
    wherein, when the third wireless charging unit is electrically connected to the first terminal on the side surface of the main body part, the maximum width is increased to 115 to 125 mm.

12. The charging device of claim 9, wherein when the first wireless charging unit is lowered, the main body part and the first wireless charging unit are in close contact with each other to form a cylindrical or prism shape.

13. The charging device of claim 9, wherein the main body part includes:
    a first main body that is formed in a hexahedral shape and has a non-slip member attached to a floor thereof; and
    an upper portion plate formed of a magnetic or metal material that is bent in a large arc shape and the upper portion plate coupled to the upper portion of the first main body on a different vertical line from the link part.

14. A charging device connected to an external power supply, comprising:
    a main body part with a first groove formed in an upper portion of the main body part, an insertion groove formed in a lower portion of the main body part, and a first terminal formed on a side surface of the main body part;
    a link part with one end thereof being hinge-coupled to the upper portion of the main body part;

a first wireless charging unit with a second groove formed in a lower portion of the first wireless charging unit and being hinge-coupled to another end of the link part; and a third wireless charging unit including a second terminal coupled to the main body part, wherein the third wireless charging unit is inserted into the insertion groove and is physically or electrically detachable from the first terminal, wherein, when the main body part and the first wireless charging unit are in close contact with each other by lowering the first wireless charging unit toward the main body part, the link part is disposed in an internal space formed by connecting the first groove and the second groove.

15. The charging device of claim 14, further comprising:
a second wireless charging unit hinge-coupled to the first wireless charging unit through a torque hinge, wherein the second wireless charging unit rotates when a predetermined force or a force greater than the predetermined force is applied to the first wireless charging unit on a different vertical line from the link part.

16. The charging device of claim 15, wherein the first wireless charging unit comprises a third groove formed in the lower portion thereof on a different vertical line from the second groove.

17. The charging device of claim 16, wherein the second wireless charging unit is coupled to a portion of the first wireless charging unit which rotates about the link part with a largest rotation radius, and the second wireless charging unit is folded into or unfolded from the third groove.

* * * * *